United States Patent [19]

Targetti

[11] Patent Number: 4,851,740
[45] Date of Patent: Jul. 25, 1989

[54] LAMP HOLDER INCLUDING A CENTRALLY OPERATED SWITCH BY MEANS OF CARRIER CURRENT TRANSMISSION

[75] Inventor: Giampaolo Targetti, Florence, Italy

[73] Assignee: Targetti Sankey S.p.A., Florence, Italy

[21] Appl. No.: 151,311

[22] Filed: Feb. 1, 1988

[30] Foreign Application Priority Data

Sep. 18, 1987 [IT] Italy .............................. 11742/87[U]

[51] Int. Cl.$^4$ ............................................ H05B 37/00
[52] U.S. Cl. .................................... 315/318; 315/315; 315/362; 362/404
[58] Field of Search .............. 362/147, 404, 249, 250, 362/285; 315/174–176, 315–318, 362

[56] References Cited

U.S. PATENT DOCUMENTS

| | | | |
|---|---|---|---|
| 4,095,139 | 6/1978 | Symonds et al. ............... | 315/315 X |
| 4,283,636 | 8/1981 | Tchang ........................... | 315/318 X |
| 4,414,617 | 11/1983 | Galindo ........................... | 362/285 X |
| 4,591,764 | 5/1986 | Nilssen ........................... | 315/174 X |
| 4,591,957 | 5/1986 | Harwood ........................ | 362/249 X |
| 4,656,398 | 4/1987 | Michael et al. ................. | 362/404 X |

Primary Examiner—Stuart S. Levy
Assistant Examiner—Steven M. duBois
Attorney, Agent, or Firm—Browdy and Neimark

[57] ABSTRACT

A track lighting system including remote on-off control of the lighting element, carrier-current transmitter for transmitting carrier-current signals over power lines, a bipolar rail for the electric power connected to the signal transmitter, a lamp holder comprising a first section cooperating with the rail, an intermediate section housing, a receiver for receiving the carrier-current signals and connected to a power switch, and an end section for supporting a lighting element, and selecting apparatus housed in the intermediate section for adjusting the receiver so that the receiver is responsive only to one among a plurality of the carrier-current signals sent over the power lines through the bipolar rail. The selecting apparatus includes a comb connection associated with the receiver and a movable contact for selecting the one signal to which the receiver is to be responsive.

3 Claims, 2 Drawing Sheets

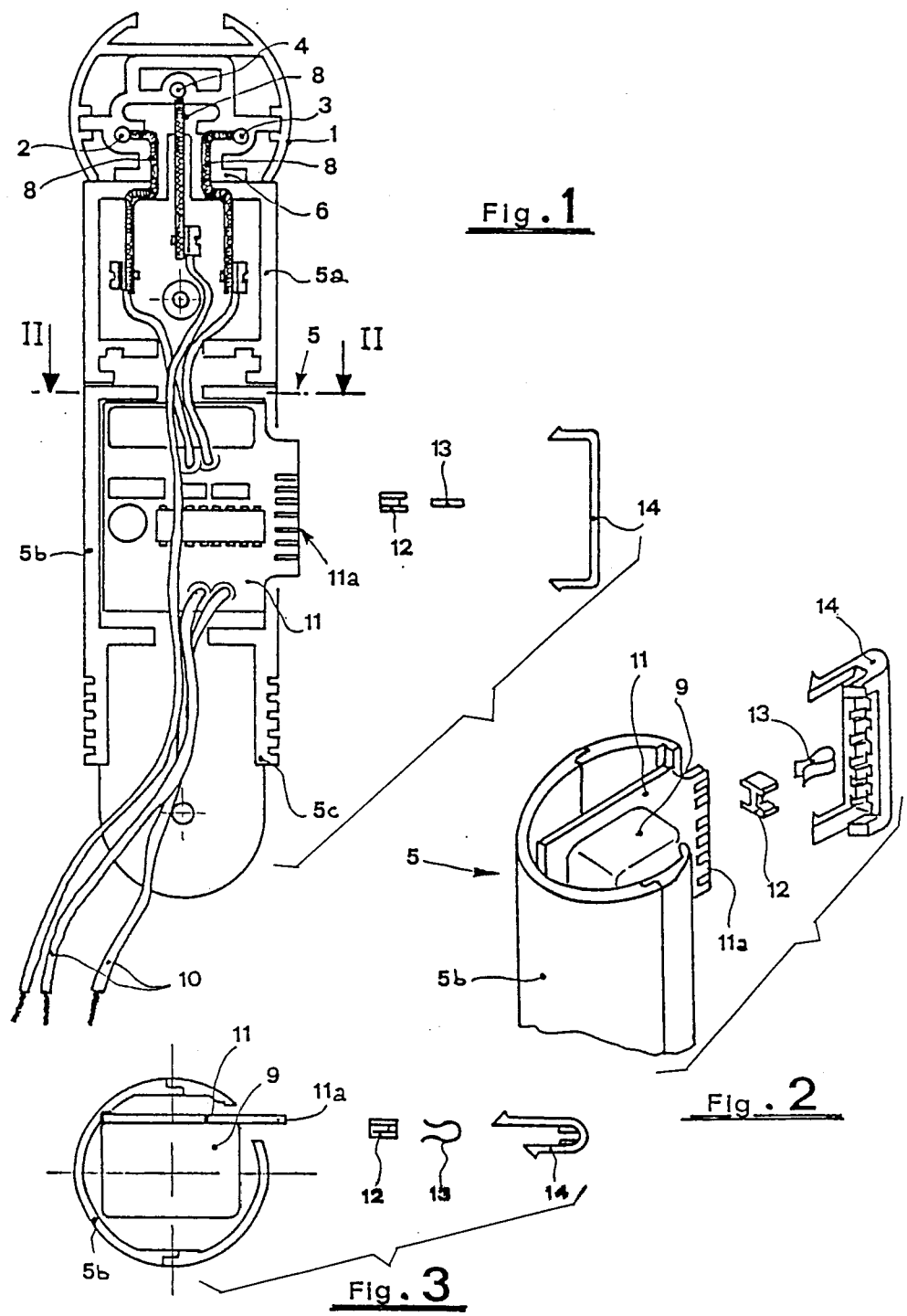

LAMP HOLDER INCLUDING A CENTRALLY OPERATED SWITCH BY MEANS OF CARRIER CURRENT TRANSMISSION

FIELD OF THE INVENTION

The present invention relates to a lamp holder including a centrally operated switch by means of carrier current transmission, designed in particular for the connection of light sources to supporting bipolar rails.

BACKGROUND ART

For the lighting of offices and environments destined to working and commercial activity in general, as well as in the case of lighting of spaces destined to the display of articles of commerce such as windows of shops, and finally also for the lighting of particular domestic spaces, frequently use is made of bipolar rails in quality of supports for the several light sources, as example orientable spot lights. At the interior of these rails there are located a phase conductor, a neutral conductor and possibly a ground connector and these are arranged in order to allow an easy lock-in of the lamp holder or lamp holders correspondingly shaped. The rails in question may carry a number of light sources, according to their electrical dimensioning, that are destined to contemporaneous operation if the rail has a single phase conductor. When the need arises of selectively actuating various light sources installed on the same rail, the rail must contain a number of phase conductors corresponding to the number of the loads or groups of loads that one may wish to operate independently. All this requires a more complex structure which is consequently more costly, both with respect to the rail and with respect to the lamp holder, and finally to the electric supply plant of the rail itself.

The aim of the present invention is to render possible the use of bipolar rails also when are located thereon loads, in particular, light sources, which have to operate in an independent way.

SUMMARY OF THE INVENTION

This aim is reached with the lamp holder according to the invention that is characterized in that it includes a power switch associated to a coded receiver for a frequency modulated carrier produced by a remote transmitter and sent along the same supply network. The switch is controlled by the modulated carrier for controlling the lighting or cut-off of the light source. The lamp holder is comprised of three sections connected with each other, the end ones carrying the connection for the attachment to the rail and, respectively, for the attachment for the light source, while the intermediate one houses the power switch.

BRIEF DESCRIPTION OF THE DRAWINGS

The lamp holder according to the invention is shown more in detail in the following disclosure of an embodiment of the same, as a non limitative example, made with reference to the attached drawings, wherein:

FIG. 1 is a lateral sectional view, partially exploded of the lamp holder according to the invention applied onto a bipolar rail;

FIG. 2 is a plan view section, also exploded, of the lamp holder according to the invention, made along the arrows II—II of FIG. 1;

FIG. 3 shows an exploded perspective view of the central portion of the lamp holder according to the invention.

DESCRIPTION OF THE PREFERRED EMBODIMENT

Figure 4:
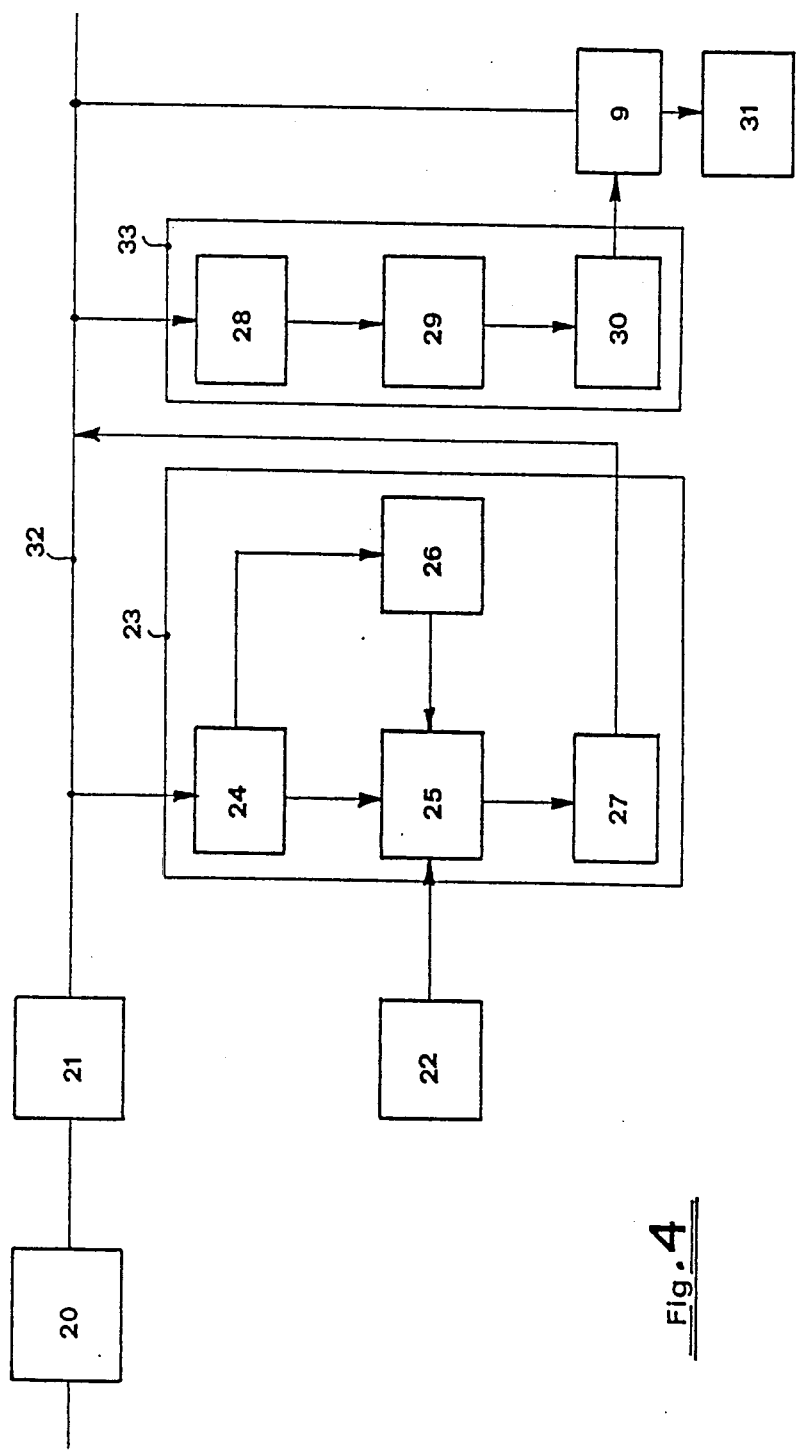
FIG. 4 shows schematically the receiving and transmitting apparatus associated to the lamp holder according to the invention.

With reference to FIGS. 1, 2, and 3, there is shown in 1 the body of a bipolar rail, of a conventional kind in which at its interior there are longitudinally located the phase conductor 2, the neutral conductor 3 and the ground connector 4.

With reference in particular to FIG. 1, there is shown, locked-in in the rail 1, the lamp holder according to the invention, generally shown in 5, by means of a conventional plug-in attachment 6 of a conventional nature, carrying the contacts 8 for phase, neutral and ground.

The lamp holder 5 comprises three sections connected each other; the section 5a is the adapter of the lamp holder and carries at its end the plug-in connection element 6; the intermediate section houses an electronic switch 9 electrically connected to the mains and to the light source by means of the electrical connections 10. The section 5c of the lamp holder constitutes the actual attachment for the light source that, in the embodiment shown in FIG. 1, is considered of the swivel kind, such as, for example an orientable spot light.

The electronic switch 9 includes an electric signal selector 11 constituted by a card along the edge of which, protruding laterally from the housing of the section 5b, there is formed the comb of the contacts 11a among which one may be selected by the insertion, on a suitable support 12, of a contact spring 13. In this way the switch 9 is enabled only by the signal, transmitted over the mains, corresponding to the selected contact. The contact comb is then protected with a cover 14.

With particular reference to FIG. 4, now the electric operation of the lamp holder according to the invention will be illustrated. In 32 there is shown for simplicity a supply line, serving both for feeding the several components of the system, and the several utilizers, as well as to carry the control signals to the utilizers. For this reason, at the input of the line 32 there has been located a filter 20 for eliminating the line disturbances in the field of interest of the transmission frequencies. The filter 20 is then connected with a main switch 21 serving to selectively supplying power to the whole system. The transmitting block, schematically shown in 23, is connected to the line 32 and comprises a power supply 24 supplying an encoder 25 and an oscillator 26. The oscillator 26 is further connected to the encoder 25 for providing the relevant frequencies in transmission. The encoder 25 may be controlled by means of an external panel 22 for setting up operating parameters of the encoder. In practice, the oscillator 26 provides the carrier, that has the only necessary feature of being at a high frequency with respect to the mains frequency, and encoder 25 provides for a suitable modulation of the same according to the parameters preset from the control panel 22. The encoder 25 controls subsequently the actuator apparatus 27, which injects the encoded signal into the network 32.

The receiving group 33 is similarly connected like the group 23 to the network supply line 32 and comprises a power supply 28 connected to a decoder 29 which in turn controls a coupler 30. The coupler 30 controls the electronic switch 9, that is supplied by the mains supply line 32 and the switch 9, on the basis of the commands received by the coupler 30, either enables or disables the power supply to the final utilizer 31.

The invention is not limited to the disclosed and shown embodiment, but includes any modification of the same.

I claim:

1. A track lighting system having means for the remote on-off control of the lighting element, said system comprising:

carrier-current transmitter means for transmitting carrier-current signals over power lines;

a bipolar rail for the electric power connected to the signal transmitter;

a lamp holder comprising a first section cooperating with said rail, an intermediate section housing, a receiver for receiving said carrrier-current signals and connected to a power switch, and an end section for supporting a light element;

selecting means housed in said intermediate section for adjusting said receiver so that said receiver is responsive only to one among a plurality of the carrier-current signals sent over the power lines through said bipolar rail;

said selecting means comprising a comb connection associated with said receiver and a movable contact means for selecting the one signal to which said receiver is to be responsive.

2. A track lighting system according to claim 1, wherein said signal transmitter comprises an oscillator coupled to an encoder controlled by a control panel and means for coupling a signal generated by said oscillator to the power lines to constitute the carrier-current signals sent to said receiver.

3. A track lighting system according to claim 2, wherein said receiver comprises means for picking the signal of said oscillator travelling over the power lines, decoder mans for identifying the one signal selected by said selecting means to which said receiver is to be responsive in order to control said power switch.

* * * * *